Figure 1:
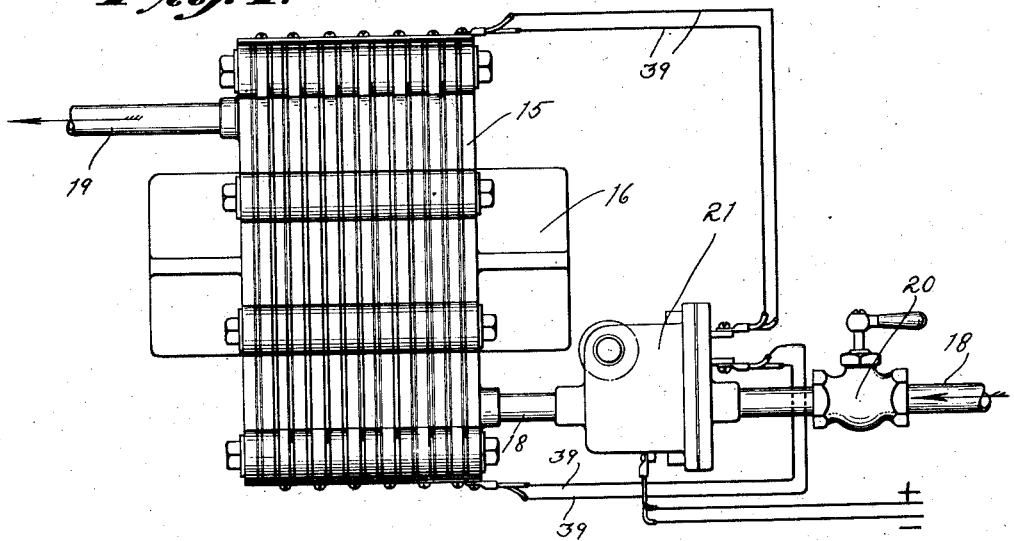

Dec. 13, 1932.  E. A. LONERGAN  1,891,000
ELECTRIC WATER HEATER
Filed May 22, 1931   4 Sheets-Sheet 1

Inventor
EDWARD A LONERGAN
By Clarence A O'Brien
Attorney

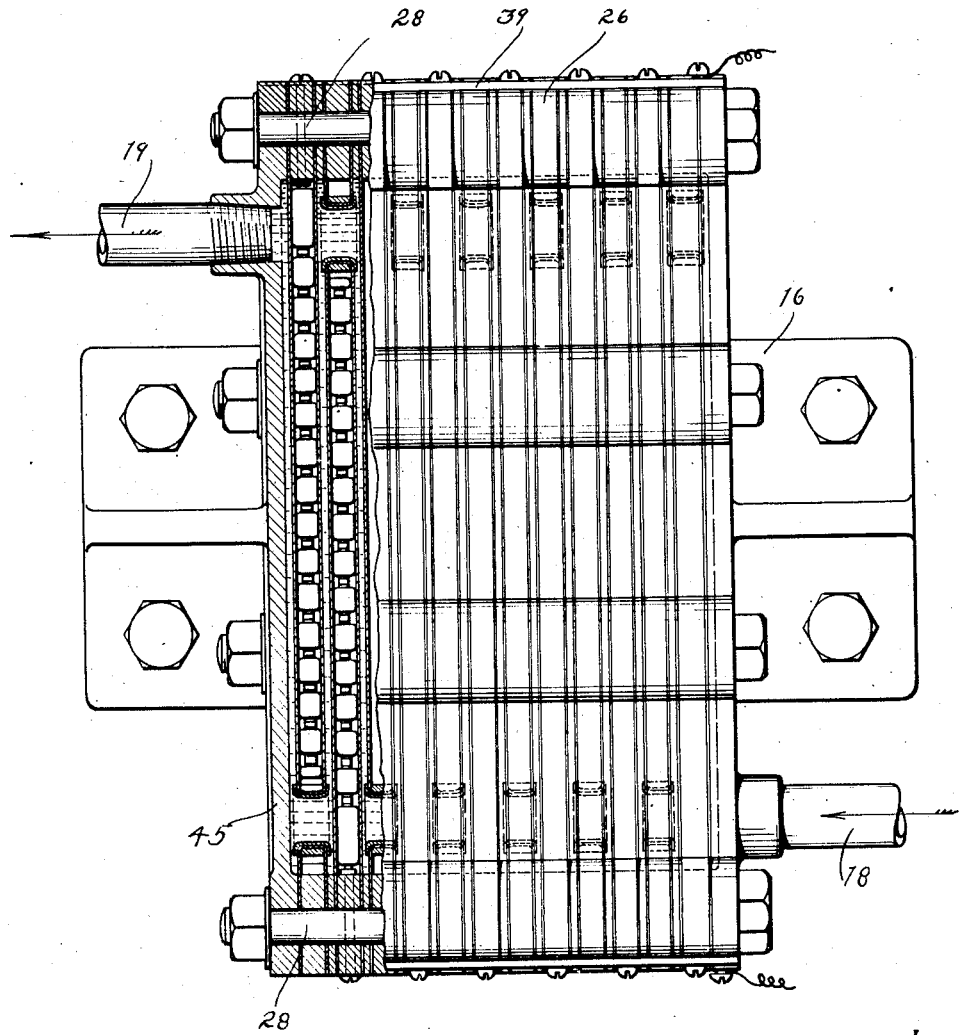

Dec. 13, 1932.  E. A. LONERGAN  1,891,000
ELECTRIC WATER HEATER
Filed May 22, 1931  4 Sheets-Sheet 3
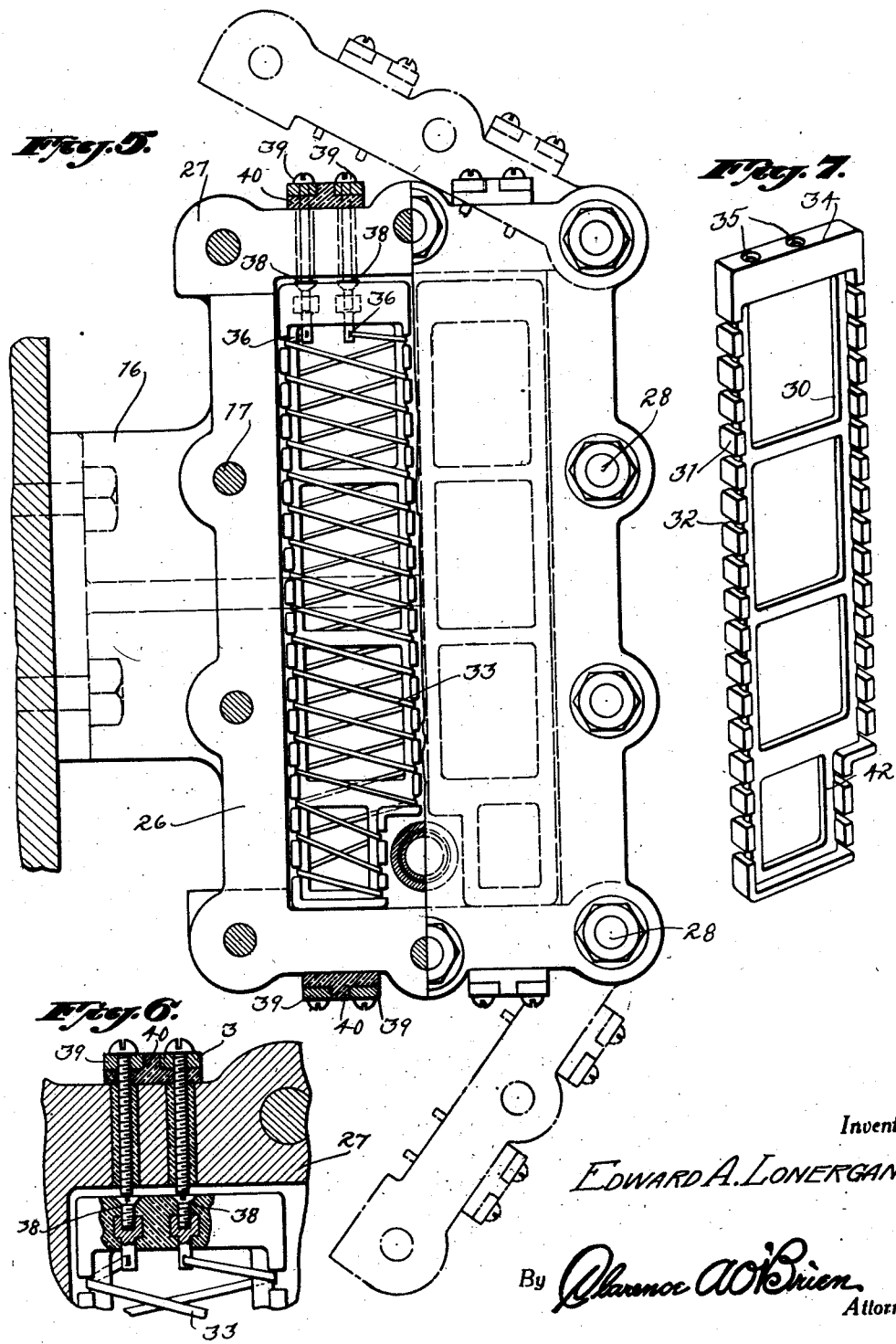
Inventor
EDWARD A. LONERGAN.
By Clarence A. O'Brien
Attorney Dec. 13, 1932.  E. A. LONERGAN  1,891,000
ELECTRIC WATER HEATER
Filed May 22, 1931  4 Sheets-Sheet 4
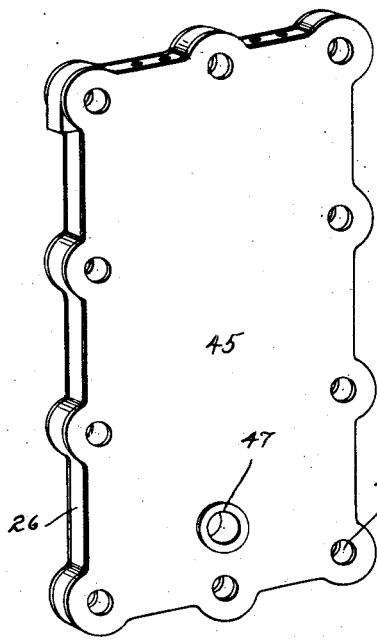
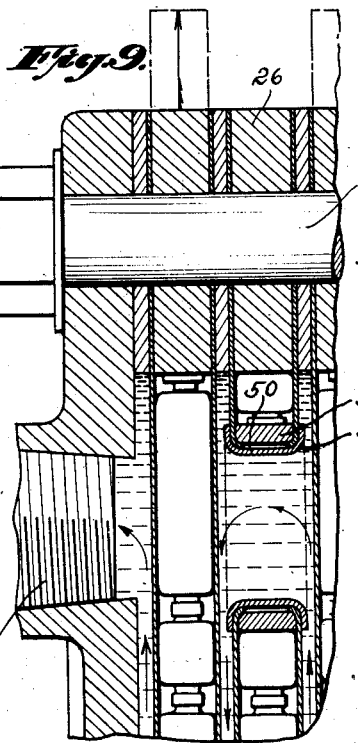
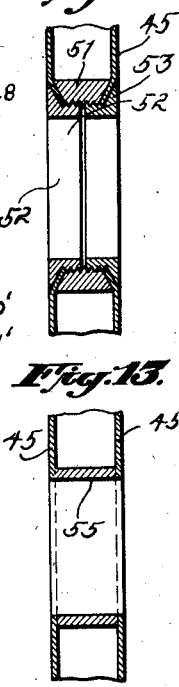
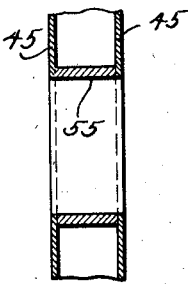
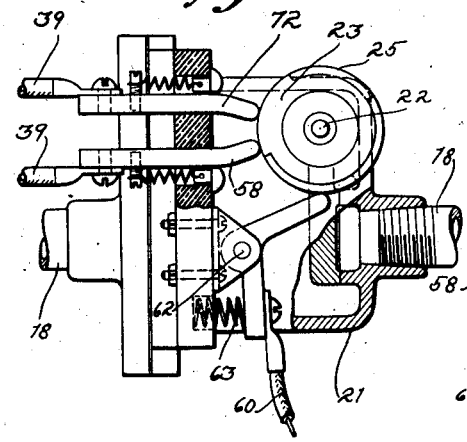
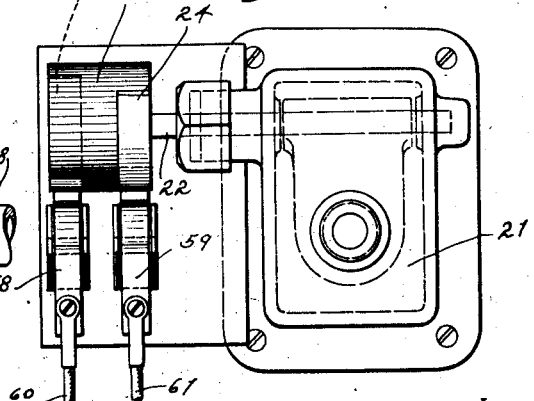
Inventor
EDWARD A. LONERGAN.
By Clarence A. O'Brien
Attorney Patented Dec. 13, 1932

1,891,000

UNITED STATES PATENT OFFICE

EDWARD A. LONERGAN, OF NEW YORK, N. Y.

ELECTRIC WATER HEATER

Application filed May 22, 1931. Serial No. 539,390.

The present invention relates to new and useful improvements in water heaters, and more particularly it pertains to water heaters of the electric type.

It is one of the objects of the present invention to provide a new and novel form of electric water heater in which the supply of current to the heating elements of the heater is automatically controlled by the flow of water through the heater.

A further object of the invention consists in a new and novel arrangement and construction of parts whereby immediately the water is turned on and begins to flow, electric current will be supplied to the heating elements of the heater.

A further object of the invention resides in a novel arrangement of heating elements whereby the heating elements are arranged in groups or series which are in some instances simultaneously energized and which in other instances are energized as groups.

A still further object of the invention resides in a new and novel construction of heating elements whereby a plurality of heating elements may be secured together to provide a water heater.

It is a further object of the invention so to construct the heater that the heating elements are removable individually with respect thereto.

A still further object of the invention resides in a new and novel form of electrical connection between the individual heating elements and the source of electric current supply which novel type of connection permits of removal of any of the heating elements without affecting the current supply to the remaining heating element.

Other objects of the invention relate to certain novel and improved constructions, combinations and arrangement of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 2:
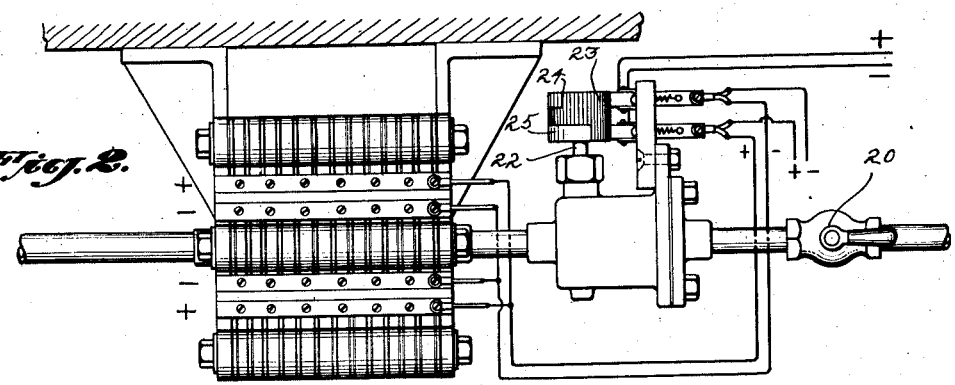
Figure 3:
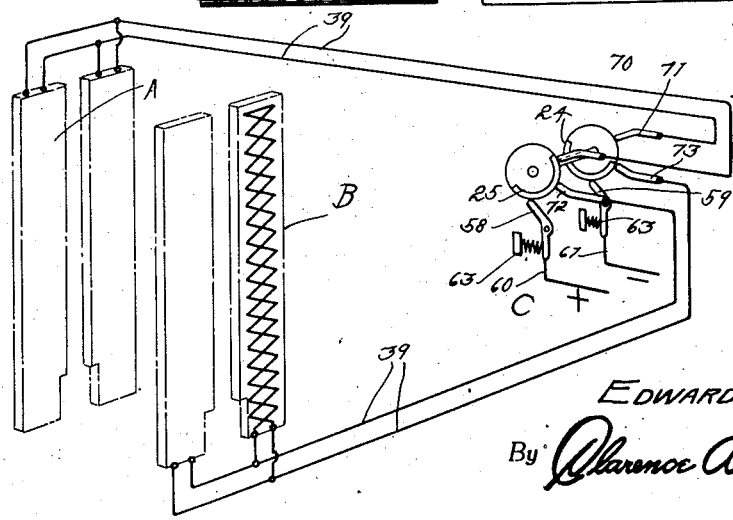

In the drawings:

Figure 1 is a schematic view of an electric water heater constructed in accordance with the present invention and showing the manner in which it is coupled up to a water supply and to a source of electric current supply, Figure 2 is a top plan view thereof, Figure 3 is a diagrammatic view illustrating the electric circuit of the water heater, Figure 4 is an enlarged view partly in front elevation and partly in section of the water heater per se, Figure 5 is an enlarged view partly in section showing the detail construction of the water heater, Figure 6 is an enlarged sectional view showing the manner in which the electrical connection is established with the electrical heating unit, Figure 7 is a detail perspective view of one of the cores or grilles of one of the heating elements of the electric water heater, Figure 8 is a detail perspective view of one of the sections of the water heater, Figure 9 is a detail sectional view on an enlarged scale illustrating the manner in which the electric heating elements and units are secured together to provide for a circulation of water therearound, Figure 10 is an enlarged view partly in elevation and partly in section showing the manner in which the electric current is supplied to the water heater, Figure 11 is a top plan view taken at right angles to Figure 10, Figure 12 is a detail sectional view illustrating the specific construction of a modified form of heating element, and;

Figure 13 is a view similar to Figure 12 illustrating a modified form of construction.

Referring more specifically to the drawings, and particularly to Figure 1, the reference character 15 designates an electric water heating device constructed in accordance with the present invention. In the present embodiment of this invention, the water heater 15 may be supported from any suitable device such as a wall or the like by means of a bracket 16 to which the water heating device may be secured by means of bolts or the like 17.

The reference character 18 designates a water supply pipe, and 19 designates the discharge for water after the same has passed through the electric heater 15. A valve such as 20 may be interposed in this pipe, and this valve is preferably of the manually operated type and controls the flow of water through the heater 15.

Interposed between the valve 20 and the heater 15, there is a housing or the like 21 and this housing is adapted to carry a motor operated by the water in its passage through the pipes to and from the heater 15 for a purpose to be hereinafter described. The motor has an extended shaft 22 upon which is mounted a commutator member 23 having two conductors 24 and 25 the purpose of which will be hereinafter specifically described.

The heater 15 consists of a plurality of open ended frame like members 26 and each of said frame like members is adapted to have its open end closed by means of a swinging end member 27. A plurality of these open frame like members are adapted to be secured together by bolts or the like 28 to provide the heater, and any number of these members may be secured together to provide a heater of the desired capacity.

Each of the open frame like members 26 carries two heating elements, and these heating elements are substantially of the same construction. By reference to Figures 5 and 7, it will be noted that each of these heating elements comprises a grille or open frame like member 30 which is provided upon its side edges with lugs or the like 31 which in turn provide openings or slots 32 for the reception of a high resistant conductor 33 which is wound about the grille like member in the manner illustrated in Figure 5. One end 34 of each grille like member is provided with openings 35 and adapted to be received in said openings 35, there are terminals 36 as illustrated in Figure 5. These terminals are so arranged that when the heating elements are placed within the open frame members 26, and the pivoted end member 27 of the frame member is moved to closed position, contacts 38 will engage the contact members 36 to supply current to the high resistance conductor 33. The contacts 38 are in circuit with strips or the like 39 carried by an insulating member or body 40 which in turn is mounted upon the several swinging members 27 which close the ends of the open frame members 26.

Each of the grille like members 30 has an offset portion 42 and when these members are placed together, these offset portions will coincide in such a manner as to provide for a connection between the several heating units and thus provide for the free circulation of water through the heater in a manner to be now described.

By reference to Figures 8 and 9, it will be noted that each of the open frame like members 26 is closed by means of side plates or the like 45 and these side plates coincide in shape with the shape of the frame like members and are provided with openings 46 for the reception of the bolts 28 heretofore mentioned. Each of these side plates has a nipple or similar opening 47 and these plates when placed together are so arranged that the nipples 47 will lie within the offset portions 42 of the heating elements as best illustrated in Figure 9. The heating units are so positioned that the offset portions of the heating elements of one set will be at the top of the heater and the offset portions of the next adjacent heating unit will be at the bottom thus giving a staggered path of flow for the fluid to follow in its passage through the heater, and thus prolonging its dwell within the heater. Suitable rings or collars or the like 50 may be employed and these extend through aligned openings in the side plate 45 and may be welded in order to form a fluid tight joint. A spacing and reinforcing ring or collar 50' encircles each of the rings 50 to enable the ends of the rings to be bent into outwardly extending flanges 51'.

In Figure 12 there is shown a slightly modified form of the invention in which internally threaded rings 51 are employed, and having threaded engagement with the rings 51 there are rings 52 which have bevel faces 53 and serve to clamp the plates 45 of the heating units against the internal rings 51 to provide a tight joint between the several heating units when the device is assembled.

In Figure 13 a slightly further modified form of the invention is illustrated and in this figure, the plates 45 of the heating units are engaged by means of a ring 55 which may be welded to the plates 45 to provide water tight joints between the several heating units.

As best illustrated in Figure 3 of the drawings, the heating units are arranged in two series they being in this figure designated series A and series B. The heating units of the series A are supplied with current and are introduced into their respective frame members from the top thereof while the heating units of the series B are inverted with respect to those of the series A.

Electric current is supplied to the several heating units from the suitable source designated C, and this phase of the invention will now be described.

Having contact with the strip 25 of the commutator 23, there is a finger 58 and contacting with the strip 24 of the commutator 23, there is a finger 59. These fingers 58 and 59 are connected to the main leads 60 and 61 respectively and as illustrated in Figure 10, they are pivotally mounted as at 62 and maintained in engagement with their respective contact strips by means of springs or the like 63. Thus it will be apparent that when the fingers 58 and 59 are engaged in engagement with their respective contact strips 25 and 24, the contact strips will be charged with electric current, assuming of course that the electric current is turned on. The conductor strips 39 of one series of heater units for example, the series A, are provided with fingers or the like 70 and 71 which engage the contact strips 25 and 24 respectively and the conductors 39 of the series B have contact fingers 72 and 73 which likewise engage the contact strips 25 and 24 respectively.

Thus it will be apparent that when the fingers 58 and 59 are in engagement with the contact strips 25 and 24, and the fingers 70 and 71 are likewise in engagement with their contact strips, the electric current will be supplied to the series A of electric heaters and that when the contact fingers 72 and 73 are in engagement with the contact strips 25 and 24 simultaneously with the fingers 58 and 59 the series B will be supplied with current, and that when all of the several contact fingers are in engagement with the contact strips 25 and 24, electric current will be supplied to all of the electric heaters.

Means is provided to render this supply of current to the electric heaters intermittent during periods of operation, and this means consists of the motor heretofore described which operates the shaft 22 and causes a rotation of the commutator member 23 when the valve 20 is operated to supply water to be heated to the heater 15.

From the foregoing, it will be apparent that the present invention provides a new and improved type of electric water heater in which the electric current is automatically supplied as the water flows through the heater, and that the current is supplied intermittently during certain periods of operation. Furthermore, the invention provides a new and improved type of water heater in which the several heating elements of the heater are independently supplied with current in such a manner that should any of the heating elements become defective, the efficiency of the water heater will not be impaired. Still further, the invention provides a water heater in which the several elements may be multiplied to any desired number thus giving a water heater of varied capacity and one which may be increased to any desired degree.

While the invention has been herein illustrated in a preferred form, it is to be understood that the invention is not to be limited to the specific construction herein shown, and that it may be practiced in other forms without departing from the spirit thereof.

Having thus described the invention, what is claimed as new and what it is desired to secure by Letters Patent of the United States, is:

1. An electric water heater comprising a plurality of heating units secured together, each of said heating units comprising a frame, side plates completely closing said frame, a grille member mounted within said frame, a high resistance conductor surrounding said grille member, and means for supplying electric current individually to said heating elements, said last mentioned means including one of the end members of the frame of each heating unit.

2. An electric water heater comprising a plurality of heating units secured together, each of said heating units comprising a frame having one of its ends pivotally mounted, side plates closing said frame, means for holding the pivoted end in frame closing position, and a plurality of electric heating elements in each frame, and retained therein by the pivoted end member thereof.

3. An electric water heater comprising a plurality of heating units secured together, each of said heating units comprising a frame having one of its ends pivotally mounted, side plates closing said frame, means for holding the pivoted end in frame closing position, and a plurality of electric heating elements in each frame, and retained therein by the pivoted end member thereof, each of said heating elements comprising a grille member of non-conducting material and a high resistance conductor wound therearound.

4. An electric water heater comprising a plurality of heating units secured together, each of said heating units comprising a frame having one of its ends pivotally mounted, side plates closing said frame, means for holding the pivoted end in frame closing position, and a plurality of electric heating elements in each frame, and retained therein by the pivoted end member thereof, each of said heating elements comprising a grille member of non-conducting material and a high resistance conductor wound therearound, said high resistance conductor terminating at one end of the grille member in adjacent contact elements.

5. An electric water heater comprising a plurality of heating units secured together, each of said heating units comprising a frame having one of its ends pivotally mounted, side plates closing said frame, means for holding the pivoted end in frame closing position, and a plurality of electric heating elements in each frame, and retained therein by the pivoted end member thereof, each of said heating elements comprising a grille member of non-conducting material and a high resistance conductor wound therearound, said high resistance conductor terminating at one end of the grille member in adjacent contact elements, and means carried by the pivoted end of the frame member for making electrical contact with said adjacent contact elements.

6. In an electric water heater including a plurality of water heating units arranged in close spaced relation between which water is adapted to flow, each of the heating units comprising a frame, side plates completely closing said frame, an electric heating element housed within said frame, and a ring member extending through aligned openings provided in said side plates adjacent one end thereof and secured thereto in sealing engagement with said end plates to provide a water passage, through the heating unit.

7. In an electric water heater including a plurality of water heating units arranged in close spaced relation between which water is adapted to flow, each of the heating units comprising a frame, side plates completely closing said frame, an electric heating element housed within said frame, and a ring member extending through aligned openings provided in said side plate adjacent one end thereof and secured thereto in sealing engagement with said end plates to provide a water passage through the heating unit, and a spacing and reinforcing collar interposed between said side plates and encircling said ring member.

In testimony whereof I affix my signature.

EDWARD A. LONERGAN.